United States Patent [19]

Jouppi

[11] Patent Number: 6,167,503
[45] Date of Patent: *Dec. 26, 2000

[54] REGISTER AND INSTRUCTION CONTROLLER FOR SUPERSCALAR PROCESSOR

[75] Inventor: Norman P. Jouppi, Palo Alto, Calif.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/552,517

[22] Filed: Oct. 6, 1995

[51] Int. Cl.$^7$ .......................................... G06F 9/22

[52] U.S. Cl. .............................................. 712/23

[58] Field of Search ................................ 712/23; 711/202

[56] References Cited

U.S. PATENT DOCUMENTS

| | | | |
|---|---|---|---|
| 4,775,932 | 10/1988 | Oxley et al. ............................. | 707/206 |
| 5,490,280 | 2/1996 | Gupta ...................................... | 395/800 |
| 5,535,346 | 7/1996 | Thomas ................................... | 395/375 |
| 5,574,935 | 11/1996 | Vidwans et al. ........................ | 395/800 |

OTHER PUBLICATIONS

United States Patent 5,530,817; Jun. 25, 1996.
Franklin et al., The Expandable Split Window Paradigm for Exploiting Fine–Grained Parallelism, Computer Architecture News, No. 2, May 20, 1992, pp. 58–67.
International Publication #WO 95/09394, Apr. 6, 1995, World Intellectual Property Organization, pp. 1–58 with drawings.
Keckler et al., Processor Coupling: Integrating Compile Time and Runtime Scheduling for Parallelism, Proceedings of the Annual International Symposium on Computer Architecture, Gold Coast, Australia, May 19–21, 1992, No. SYMP 19, May 19, 1992, Institute of Electrical and Electronics Engineers, pp. 202–213.
Hunt, Advanced Performance Features of the 64–bit PA–8000, Digest of Papers of the Computer Society Computer Conference (Spring) Compcon, Technologies for the Information Superhighway San Francisco, Mar. 5–9, 1995, No. Conf. 40, Mar. 5, 1995, Institute of Electrical and Electronics Engineers, pp. 123–128.
Fossum et al., Designing a VAX for High Performance, Computer Society International Conference (Compcon), Spring Meeting, Los Alamitos, Feb. 26–Mar. 2, 1990, no. Conf. 35, Feb. 26, 1990, Institute of Electrical and Electronics Engineers, pp. 36–43.
Palacharla et al., Decoupling Integer Execution in Superscalar Processors, Proceedings of the 28$^{th}$ Annual International Symposium on Microarchitecture, Ann Arbor, Nov. 29–Dec. 1, 1995, no. Symp. 28, Nov. 29, 1995, Institute of Electrical and Electronics Engineers, pp. 285–290.
James E. Smith, "Dynamite Instruction Scheduling and the Astronautics ZS–1", IEEE Jul. 1989, pp. 21–34.

*Primary Examiner*—David Y. Eng
*Attorney, Agent, or Firm*—Cesari and McKenna, LLP

[57] ABSTRACT

In a superscalar computer system, a plurality of instructions are executed concurrently. The instructions being executed access data stored at addresses of the superscalar computer system. An instruction generator, such as a compiler, partitions the instructions into a plurality of sets. The plurality of sets are disjoint according to the addresses of the data to be accessed by the instructions while executing in the superscalar computer system. The system includes a plurality of clusters for executing the instructions. There is one cluster for each one of the plurality of sets of instructions. Each set of instructions is distributed to the plurality of clusters so that the addresses of the data accessed by the instructions are substantially disjoint among the clusters while immediately executing the instructions. This partitioning and distributing minimizes the number of interconnects between the clusters of the superscalar computer.

9 Claims, 4 Drawing Sheets

REGISTER AND INSTRUCTION CONTROLLER FOR SUPERSCALAR PROCESSOR

FIELD OF THE INVENTION

This invention relates generally to computer systems, and more particularly to processors which can issue multiple instructions during each processor cycle.

BACKGROUND OF THE INVENTION

In order to achieve higher performance, modem computer systems are beginning to issue more than one instruction for each processor clock cycle. Each instruction includes a single operation code (opcode) specifying its function, as well as one or more operands for specifying addresses of data. The data addresses can be memory addresses or register addresses. Computers that can issue more than one instruction for each clock cycle are called superscalar computers.

Traditionally, because of the complexity of superscalar computers, the number of instructions which can be issued per processor cycle has been relatively small, e.g., two to four instructions per cycle. Furthermore, the number of different types or classes of instructions which can be executed concurrently may be limited. By way of example, a triple-issue processor might be able to concurrently issue an arithmetic instruction, a memory reference instruction, and a branch instruction. However, the traditional superscalar processor can not concurrently issue three memory reference instructions.

Each instruction may include source and destination operands. The operands can specify addresses of data manipulated by the instructions. While executing, the data are stored in high-speed registers that are part of the processor. Usually, registers that have a common architecture are organized into sets of registers, known as register files.

A processor may be equipped with separate floating-point and fixed-point or integer register files. Ports are used to read and write the register files. By restricting the number and type of instructions which can concurrently issue, the access paths or "ports" of registers can be simplified. For example, if only one fixed-point arithmetic instruction and only one fixed/point load/store instruction can issue concurrently, at most, three read or output ports, and two write or input ports are required to access the fixed-point registers.

As superscalar processors are designed with larger issue widths, more ports to the register files may be required. Increasing the number of ports consumes surface area of the semiconductor die used for the circuits of the processor. The number of circuits can increase worse than linear when the number of ports is increased. In addition, as the number of ports is increased, access latencies can also increase.

One approach avoiding the disadvantages of a large multiported register file would have multiple copies of the various register files, one copy for each possible data path. Then, the number of read (output) ports required for each register file can be reduced. However, having multiple copies of the register files increases the complexity of write accesses. Data stored in one copy of the register file must be duplicated in other copies of the register file. This means additional write (input) ports, and hence, the total number of ports is increased. Also, with duplicate register files the chip area must increase.

Therefore, it is desired to have means and methods which increase the number of instructions concurrently issued by a superscalar processor without substantially increasing the complexity of interconnects of the registers used to store data manipulated by the executing instructions.

SUMMARY OF THE INVENTION

Disclosed is a method and apparatus for dynamically scheduling instructions to multiple execution units of a superscalar processor. The apparatus, using "hints" provided during the generation of the instructions, schedules instructions so that the performance of the processor is increased. In the superscalar computer system, a plurality of instructions are executed concurrently. The instructions being executed access data stored at addresses of sets of registers of the superscalar computer system.

In one aspect of the invention, an instruction generator, such as a compiler, partitions the instructions into a plurality of sets of instructions. The plurality of sets of instructions are substantially disjoint according to the addresses of the data to be accessed by the instructions while executing in the superscalar computer system.

In another aspect of the invention, the superscalar system includes a plurality of execution clusters for executing the instructions. There is one cluster associated with each one of the plurality of sets of registers. The "cluster" is physically organized around a set of registers to decrease the length of the wiring runs. Each cluster includes a plurality of execution units, a register renaming unit, a dispatch buffer, and an instruction scheduler. The physical addresses of the sets of registers are also substantially disjoint among the clusters.

According to the invention, during operation of the apparatus, the sets of instructions are distributed to the plurality of clusters so that the addresses of the data accessed by the operands of the instructions are substantially disjoint among the plurality of clusters while immediately executing the instructions. This partitioning and distributing of the instructions increases the number of instructions which can concurrently be issued by a superscalar processor without substantially increasing the complexity of interconnects of the registers used to store data manipulated by the executing instructions.

DETAILED DESCRIPTION OF THE PREFERRED EMBODIMENT

Figure 1:
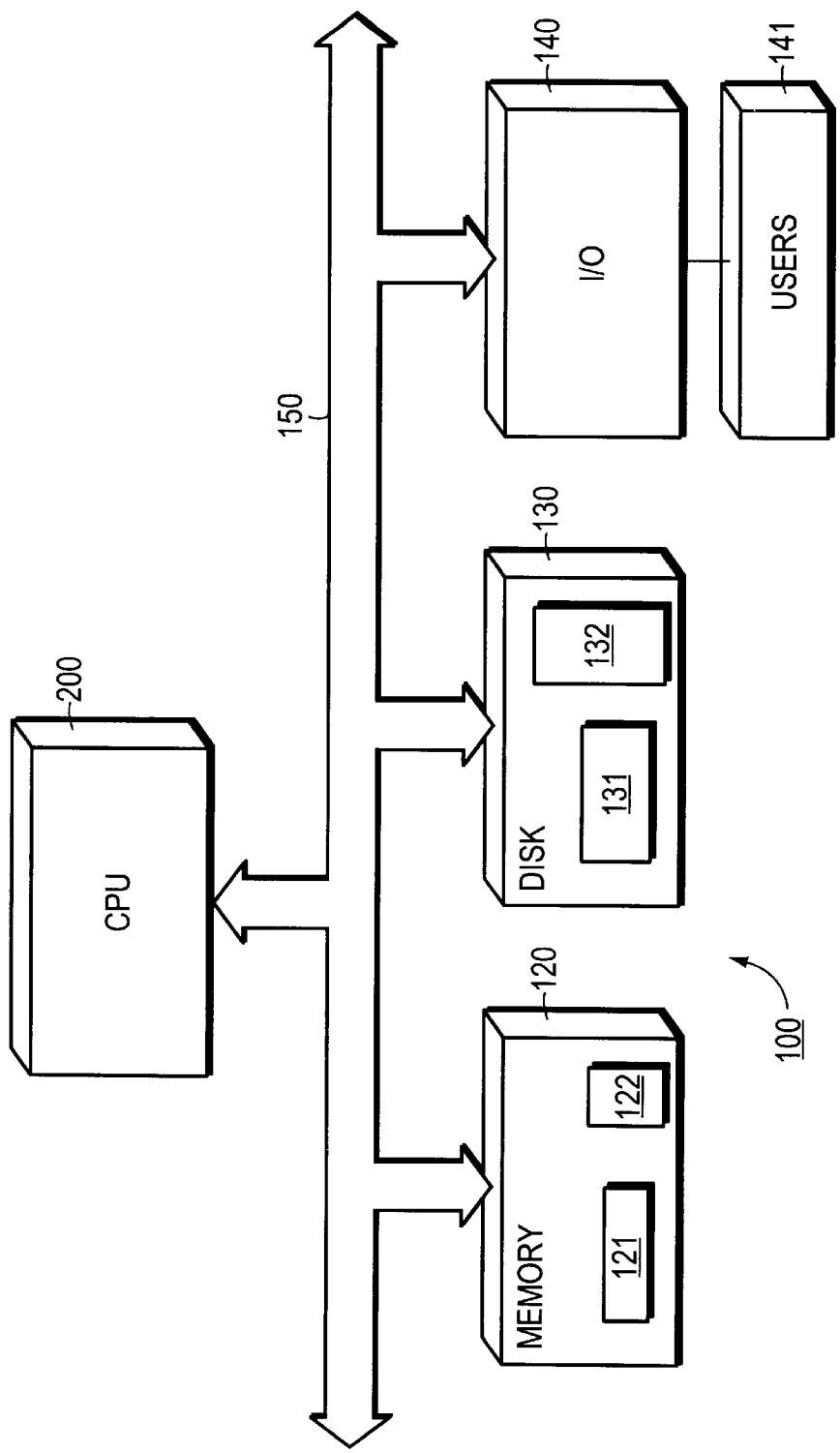
FIG. 1 is a top-level block diagram of a computer system including a processor designed according to the principles of the invention.

Now turning to FIG. 1, there is shown a computer system 100 including a central processor unit (CPU) 200, a memory 120, a disk 130, and an input/output (I/O) interface 140 connected to each other by a communications bus 150.

The CPU 200 is of the type which can concurrently issue multiple instructions during a single processor execution cycle. Such processors are generally known as superscalar processors. The CPU 200 can include on-chip caches, registers, and execution units. The caches can include separate instruction and data caches. The execution units can execute instructions of different types. For example, the units can access data 122 of the memory 120, e.g., load and store instructions of a program 121, perform arithmetic operations, for example, add and multiply instructions, and control execution flow, e.g., branch, jump, and call instructions.

The registers can be general purpose, or dedicated to storing the 122 data formatted according to operations performed on the data. For example, the registers can include sets of registers, e.g., register "files," specifically designed to store floating-point, or fixed-point data. Certain registers may always store predetermined values, for example, zero and one, which are frequently used. Other registers, such as stack pointers, may have specialized functions.

The memory 120 can be made of, for example, semiconductor circuits which can be accessed randomly by addresses. The memory 120 can be used to store signals representing instructions of software programs 121 and data 122 which are processed by the CPU 200. The software programs can be operating system programs and application programs. The programs can also include means for generating machine executable instructions such as text editors, compilers, assemblers, linkers, and so forth. The instructions 121 and the data 122 can also be generated by other computer systems.

In the preferred embodiment of the invention, as explained in more detail below, the instructions 121 are generated as substantially disjoint sets. For example, the instructions 121 are partitioned among the sets according to addresses of the data 122 accessed by the operands of the instructions 121 while executing. In the CPU 200, the data being immediately manipulated by the executing instructions 121 are stored in the registers of the CPU 200. The registers are addressed by register operands of the instructions. Therefore, the disjoint partitioning in this implementation is based on "names" of the registers.

The disk 130 can be used to persistently store the instructions 121 and the data 122 on magnetic or optical media while the computer system 100 is operating, or while the computer is not operating. The instructions 121 and data 122 can be part of larger software systems 131 and databases 132 sourced via the I/O interface 140.

The I/O interface 140 can be used to communicate instructions and data with users 141, other peripheral components, and other computer systems in a distributed network of computers. The system bus 150 is used to transport timing, control, address, and data signals during operation of the system 100.

During operation of the computer system 100, the instructions 121 and the data 122 are, typically, first fetched from the disk 130 or the I/O 140. The instructions 121, while being executed, manipulate the data 122. Each instruction usually includes an operator code (opcode), and one or more operands. The opcodes tell the processor circuits how to manipulate the data stored at the addresses specified in the operands.

The instructions 121 and the data 122 are first stored in the caches of the CPU 200 while they are being processed. During immediate processing of the opcodes by execution units of the CPU 200, the data 122 are stored in the registers addressed by the register operands. Processed data can be transported back, via the bus 150, to the memory 120, disk 130 for storage, and to the I/O interface for further communication.

Figure 2A:
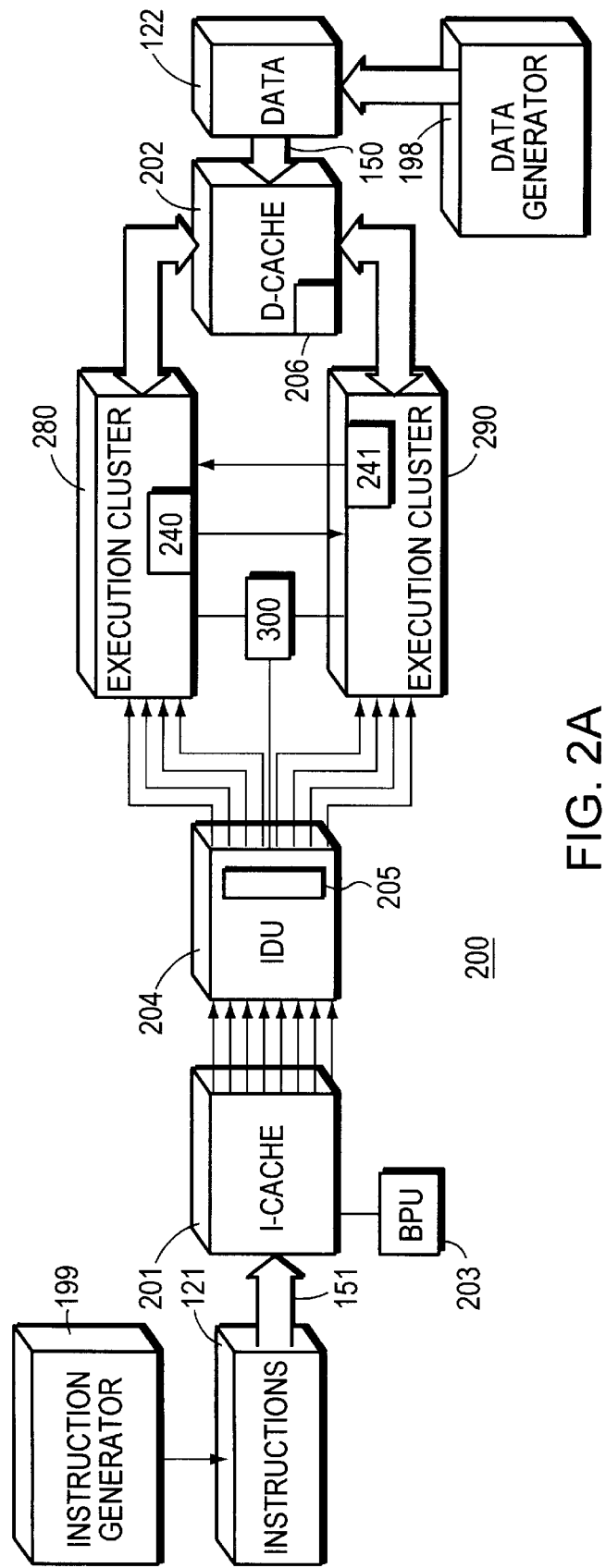
FIG. 2A is a high level block diagram of the processor of FIG. 1.
Figure 2B:
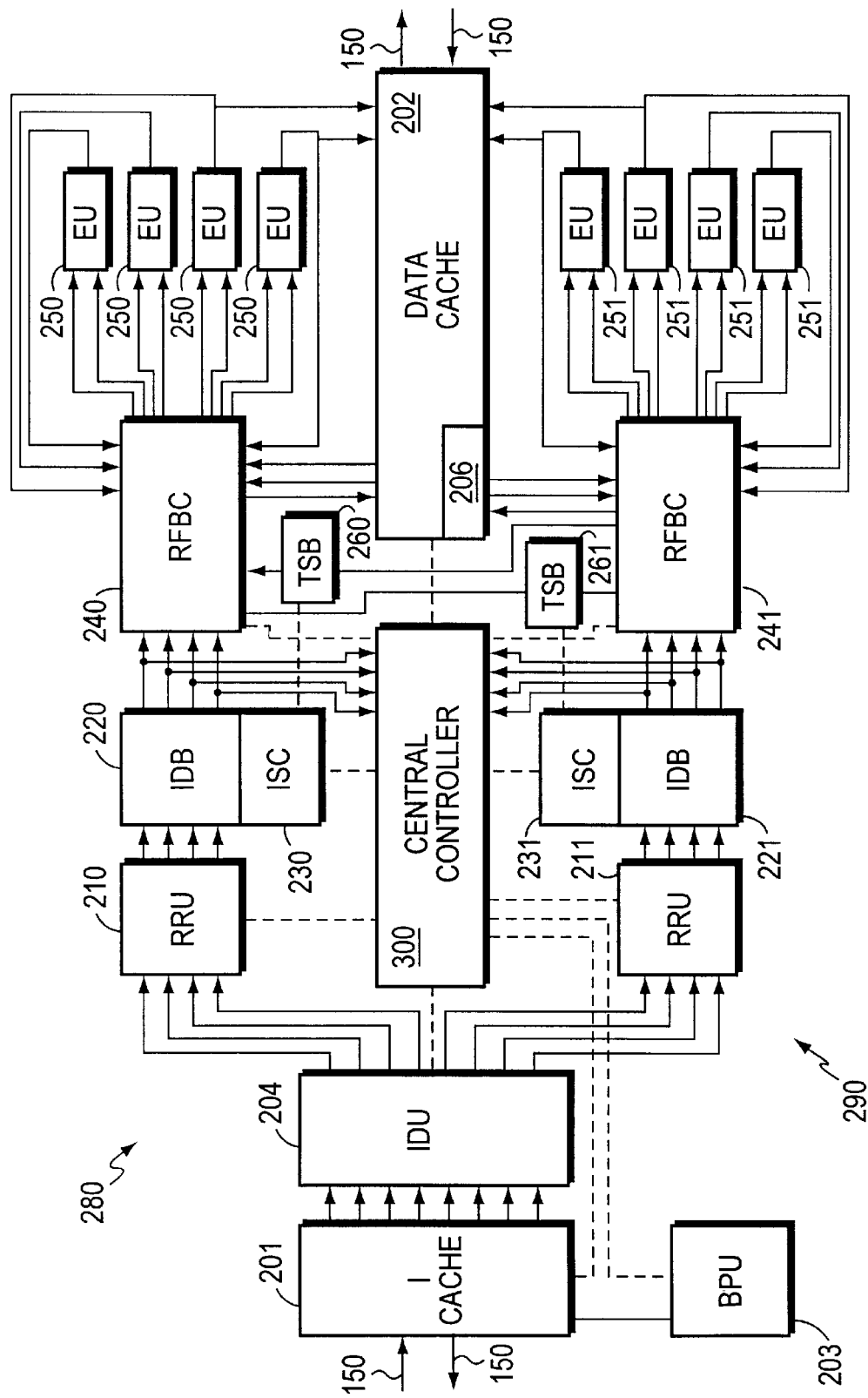
FIG. 2B is a detailed block diagram of the processor of FIG. 1.

FIGS. 2A and 2B show an arrangement of the CPU 200 according to a the preferred embodiment. FIG. 2A shows an instruction generator 199 and a data generator 198 respectively generating the instructions 121 and the data 122. The generators 198 and 199 can be software programs or, in real-time systems, the generators may be implemented as specialized processors or other hardware circuits. In FIG. 2B, connections which carry data signals are indicated as solid lines, and connections for control signals are shown as broken lines.

The CPU 200 includes an instruction cache (I-cache) 201 and a data cache (D-cache) 202. The caches 201–202 are connected to the memory 120 by the bus 150. A branch prediction unit (BPU) 203 and an instruction distribution unit (IDU) 204 are connected to the I-cache 201. Outputs of the IDU 204 are connected to two execution clusters 280 and 290, detailed below. The output of the clusters 280 and 290 are connected to the D-cache 202.

During operation of the CPU 200, the instructions 121 are fetched from the memory 120 via the bus 150 and stored in the I-cache 201. The order in which the instructions 121 are fetched is determined in part by the BPU 203. This means, that the instructions 121 are fetched dependent on a predicted behavior of the execution flow based on previously executed instructions.

As shown in FIGS. 2A and 2B, the IDU 204 can concurrently distribute multiple, e.g., eight, instructions to the clusters of the CPU 200, four to each one of the execution clusters 280 and 290. In the preferred embodiment of the invention, the instructions 121 are distributed to the clusters so that the register addresses of the data 122 accessed by the instructions 121 are substantially disjoint between the clusters 280 and 290.

The IDU 204 includes a distribution buffer 205 to store instructions that are being distributed to the execution clusters 280 and 290. As the instructions 121 are fetched from the instruction cache 201, the IDU 204 assigns each instruction a unique serial number. These serial numbers can be thought of as always increasing. During operation, there will be gaps in extant serial numbers of instructions in progress due to the flushing of instructions on a branch misprediction, and other circumstances.

Therefore, the range of the serial numbers needs to be larger than the maximum number of instructions which can be pending at any one time. Similarly, it is convenient for control purposes to have the range of possibly extant serial numbers be large. A large range of serial numbers simplifies the computation of a relative age of pending instructions. In an actual implementation, the number of bits used to store the serial number only need to be sufficiently large to represent several times more instructions than the maximum possible number of instructions in progress in the processor 200 at any point in time.

In one embodiment of the invention, the instruction distribution logic includes a plurality of autonomous instruction "pickers", one for each cluster. The pickers inspect the instructions stored in the distribution buffer 205, and copy the instructions to the clusters as needed. As each picker inspects the instructions in the distribution buffer, a bit associated with the location where the instructions is stored is set. When all pickers have inspected the instruction, e.g., one bit is set for each cluster, the IDU 204 can reclaim the location of the distribution buffer 205 to store a next fetched instruction.

The sequencing of the instructions through the buffer 205 can be done by arranging the buffer 205 as a connected set of shift registers. Alternatively, if the buffer 205 is arranged as a ring buffer, a head and tail pointer can control the sequencing. If the processor 200 includes a large number of clusters, it may be advantageous to provide a set of broadcast busses to buffer shown, for example, in FIGS. 2A and 2B as ports 208a and 209a of distribution buffer 205 and distribute the instructions. In systems with a small number of clusters, a multiported distribution buffer would be a preferred implementation for distributing instructions to the multiple execution clusters.

As an advantage of the invention, distributing the instructions over multiple execution clusters makes possible the partitioning of the register file into several smaller files, one for each execution cluster with only a small amount of duplication between the files. Thus, each smaller register file can have a small number of ports resulting in lower access latencies, while the total collection of register files still has a high port bandwidth overall.

In a preferred embodiment of the invention, the order in which instructions are executed in the multiple execution clusters is chosen dynamically. Dynamic scheduling to multiple clusters means that the decisions as to the manner in which instructions are executed are made at run-time. In contrast, traditional static scheduling typically determines the order of instruction execution at the time the instructions are generated. Static scheduling cannot take advantage of information which is only available at run time, e.g., cache misses, processor status states, branch mis-prediction, etc. Therefore, dynamic scheduling can have better performance than static scheduling.

During dynamic instruction scheduling, registers may be allocated or "renamed." Allocating the physical registers to the operands requires that registers specified in the operands of instructions be treated as "virtual" registers until the time that the instructions are ready to execute. Instructions with virtual register names have operands assigned to the physical registers at the time that the instructions are issued for execution. This has the advantage that the scheduling of instructions is not limited by conflicts in register addresses, but depends on true data dependencies and machine execution capabilities. As a result, better performance can be achieved.

In one embodiment of the invention, the CPU 200 includes a plurality, e.g., two or more, execution clusters 280 and 290. As an advantage of the invention, the number of execution clusters can easily be scaled up to further increase the number of instructions which can concurrently be issued. As shown in FIG. 2B, each of the plurality of clusters 280 and 290 respectively comprise: register renaming units (RRU) 210–211; instruction dispatch buffers (IDB) 220–221, instruction scheduling controllers (ISC) 230–231, register files/bypass circuits (RF/BC) 240–241, a plurality of, e.g., four, execution units (EU) 250–251, and transfer staging buffers (TSB) 260–261.

The plurality of execution units 250 and 251 can each include, for example, a fixed-point arithmetic unit, a floating-point arithmetic unit, a memory access (load/store) unit, and a branch unit. A central controller 300, described in further detail below, synchronizes the activities of the processor 200.

During operation, each of the clusters 280 and 290 concurrently receives instructions from the IDU 204 under direction of the central controller 300. The distributed instruction includes virtual register specifiers or "names" of the operands. The names are assigned "physical" names by the RRUs 210–211. The physical names of the register operands, for cluster 280, correspond to the addresses of the registers in register file 240, and for the cluster 290, to the addresses of the register file 241.

After distribution and renaming, the instructions for clusters 280 and 290 are respectively stored in the instruction dispatch buffers 220 and 221. At any one time, each IDB 220 or 221 can store up to, for example, sixteen or thirty-two instructions. The locations of the IDBs 220–221 used for storing instructions can randomly be addressable by the instruction scheduling controllers 230 and 231.

The ISCs 230–231 respectively dispatch the instructions, e.g., "issue" the instructions, depending on instruction types, e.g., arithmetic, access, branch, etc., to the execution units 250 and 251. While processing the instructions, the execution units 250 and 251 respectively maintain the data 122 referenced by the operands of the instructions 121 in the register files 240 and 241. The bypass circuits of the register files allow the execution units to capture data directly from the signalling paths, as the data are being stored in the registers. Thus, the bypass circuits can save processor cycles when an execution unit needs data that has just been manipulated by another execution unit. Upon a completion of processing, the data 122 can be transferred, via the D-cache 202 and bus 150, back to the memory 120.

The central controller 300 coordinates the functioning of the processor 200. The controller 300 coordinates the normal operation of the execution clusters, exception conditions, and other unanticipated events. However, decisions as to how the instructions are to be issued to the execution units are delegated to the ISCs 230–231.

For reasons stated below, instructions having multiple operands may be "cloned" and distributed to more than one cluster. Therefore, the coordination of most operand transfers happens as part of normal processing without substantial intervention by the central controller 300. For example, an arithmetic operation executing in one cluster and reading operands from a cloned instruction in another cluster, receives the operand values fetched by the cloned instruction.

The central controller 300 also manages the commitment of instructions after the instructions have been successfully executed. Each cluster maintains the serial number of the "oldest" instruction which has not yet completed execution. Each cycle, the central controller 300 chooses the instruction with the oldest serial number, and broadcasts this value to all of the other clusters.

This enables the other clusters to commit all instructions having serial numbers up to, but not including, the oldest serial number. Once an instruction has been committed, the instruction, absolutely, cannot be reversed. Thus, any temporary buffers utilized by a pending instruction can be freed upon the commitment of the instruction.

The central controller 300 also manages the states of pending instructions on a branch mis-prediction. in this case, the central controller 300 broadcasts the serial number of the first instruction which was executed in error. The clusters, in response, delete the states corresponding to the erroneously executed instructions. For example, if an instruction with serial number 27 is a mis-predicted branch instruction, the states of all instructions with serial numbers greater than or equal to 27 are deleted. Subsequently, the IDU 204 can fetch and distribute instructions beginning at the correct branch target address, and assign serial numbers to the instructions. The assigned serial numbers are higher than the serial numbers of the incorrectly executed instructions.

Similarly, on an exception or interrupt condition, the central controller 300 broadcasts the serial number of: either the instruction causing the condition, or the following instruction, depending on the condition. The clusters, in response to the broadcast, can then delete all states associated with pending instructions having serials numbers not less than the broadcast serial number. Now, instruction fetching and distribution can resume as described for the branch mis-prediction.

According to the preferred embodiment of the invention, the manner in which the instructions are concurrently distributed over the execution clusters 280 and 290 is decided by the instruction distribution unit 204 using "hints" encoded with the instructions. The hints are provided by the generator 199 of the instructions 121, for example, a compiler, an assembler, or a hardware instruction generator.

The distribution of the instructions 121 is such that the amount of data to be communicated between the clusters 280 and 290 is reduced. Reducing the amount of data to be communicated can lead to a reduction in the number of signaling paths or ports of the register files 240–241 that are required for optimal performance, which in turn reduces the complexity of the processor 200.

In the preferred embodiment, the instructions are distributed to the execution clusters 280 and 290 so that the number of intermediate transfers of signals from one execution cluster to another is minimized. In most modem processors, an intermediate transfer of signals would require an additional processor cycle, thus, fewer transfers require fewer processing cycles overall. However, to the extent that additional transfers are not on the critical path of the computation, additional transfers over the minimum required may be helpful in more evenly balancing the computation among the multiple clusters.

Figure 3:
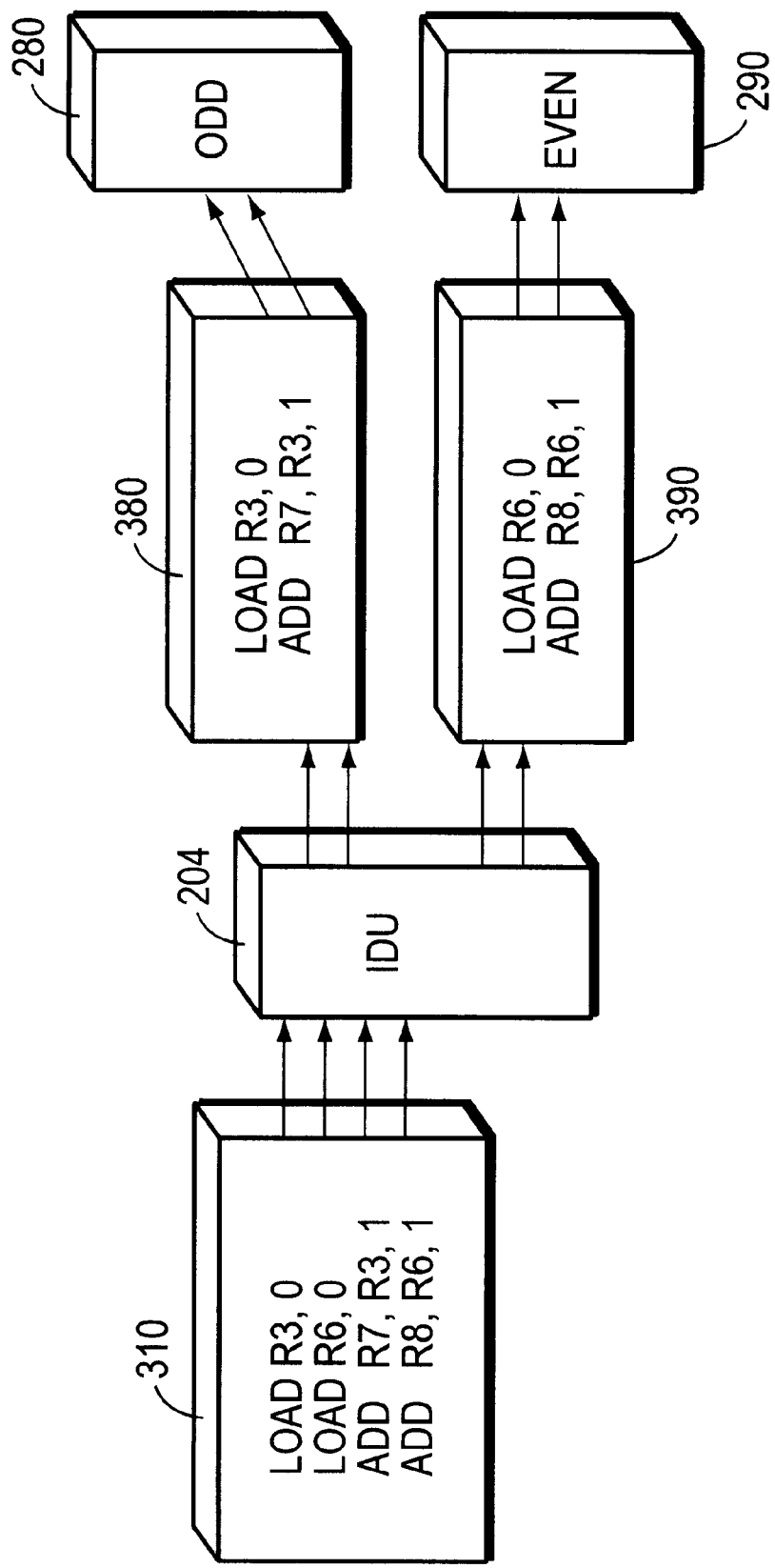
FIG. 3 is a portion of a program including instructions to be scheduled for multiple execution clusters.

FIG. 3 shows an example portion 310 of the instructions 121. The portion 310 includes instructions which first load registers named R3 and R6 with values. Then, the stored values are added to the constant value "1" to produce second values in registers named R7 and R8. The load instructions have single operands, and the add instructions have two source and one destination operands. Although this example only shows four instructions, it should be understood that the invention can also be worked with a larger number of instructions.

The processor 200, as shown in FIGS. 2A and 2B, includes two distinct execution clusters 280 and 290 for processing the instructions 121. Therefore, in a preferred embodiment, instructions 380 referencing "odd" registers R3 and R7 are distributed by the IDU 204 to the first execution cluster 280, and instructions 390 referencing "even" registers R6 and R8 are distributed by the IDU 204 to the second execution cluster 290.

If the full execution of each of the instructions takes one processor cycle, the four instructions of the program segment 310 can be executed in two cycles. Because the register addresses in the clusters 280 and 290 are distinct, the instructions can execute without interference, and no intermediate transfers of signals between execution clusters 280 and 290 are required.

In reality, the instructions 121 typically depend on at least one, and often, more than one operand. Good scheduling of instructions to the execution clusters 280 and 290 to achieve minimum execution time is a difficult problem. Perfect scheduling that results in a minimum execution time is intractable. The invention provides a solution to this problem that achieves good performance using straight forward and efficient circuits.

The invention proposes that a solution to the problem is partially provided, in an upward extendible way, by hints provided with the register operands of the instructions 121.

The hints are supplied by the generator 199 of the instructions 121. In general, depending on the number of parallel execution clusters which comprise the processor, the generator 199 partitions the instructions into a like number of sets. If the generator 199 is a compiler, then the partitioning can be by the virtual naming of the register operands. By virtually naming the register operands during instruction generation, physical register assignment or allocation can be performed dynamically when the instructions are issued for execution.

For example, if there are two execution clusters, the instructions are partitioned into two sets. The instructions are assigned to the sets so that the virtual names of registers specified in operands of the instructions are substantially disjoint. This means that the virtual names used in the operands of the two sets of instructions are mostly non-overlapping. If the register naming is substantially disjoint, then there is minimal need for the two register files 240–241 to communicate data with each other while the units 250 are concurrently executing instructions.

In other words, instructions which include register "virtual" operands which are even, e.g., R6 and R8, are assigned to the first execution cluster 280 by the IDU 204. Odd register operands, such as R3 and R7, are assigned to the second execution cluster 290 by the IDU 204.

Alternatively, the virtual naming of the registers, and the distribution of the instructions 121 among the execution clusters can be by range of addresses of the registers. Take, for example, a processor equipped with thirty-two fixed and floating point registers, e.g., R0, R1, . . . R31, and RF0–RF31. Registers in the range of R0–R15, are assigned to the first register file 240 and execution cluster 280, Registers R16–R31 are assigned to the second register file 241 and execution cluster 290. Floating point registers, e.g., RF0–RF31, can similarly be assigned.

Registers which store constant values, e.g., zero and one, can be accessed from any execution clusters. It may be beneficial to have several registers appear in all of the clusters, with parallel transfers resulting in all of the clusters for any write access.

This partitioning of the instructions, clusters, and register files can be upward extended to processors having more than two clusters. For example, in a processor with four execution clusters, the run time assignment of the thirty-two registers can be in groups of eight. However, as an advantage, the same program can still execute in the processor of FIG. 2, where the distribution of the instructions, and the assignment of the registers is on the basis of two clusters.

Instructions which solely use registers allocated to one of the execution clusters are only distributed to the cluster containing those registers. An instruction with operands which use registers of more than one cluster needs to be distributed to all of the clusters that contain any of the source and destination registers of the instruction. This allows the instruction issue and scheduling hardware in each of the clusters to operate properly taking into account constraints posed by distributing instructions to multiple clusters.

In the case where the distribution of the instructions cannot be perfectly disjoint with respect to the operand addresses, the invention provides means for transferring data between the plurality of clusters. In a preferred embodiment, the transferring means includes associative memory buffers, explained in greater detail below.

In the case, where an instruction includes register operands of more than one cluster, the instruction should be executed in the cluster where the majority of the operands of the instruction have their registers. This minimizes the number of intermediate data transfers. For example, an instruction which has two source operands in a first cluster and a destination register in a second cluster should be executed in the first execution cluster, and only forwarding the result to the destination register of the second execution cluster.

In the case where no cluster has a majority of the registers, the instruction can be executed in any cluster containing one of the register operands, although execution in the "destination" cluster would be the preferred case. When the instructions are distributed across multiple clusters, any source operands present in a cluster not executing the instruction needs to forward its results when available. Similarly, when an execution cluster produces a result destined for another cluster, the result needs to be forwarded when available.

In a preferred embodiment, the transfer staging buffers 260–261 are used to forward results from one cluster to another. Each transfer staging buffer is configured as an associative memory. The transfer buffers 260–261 can be associatively addressed by, for example, the instruction serial numbers, register addresses, or transaction types of the registers, e.g., result operand, or source operand.

To further minimize the need for transfers, some of the registers may automatically be updated. Registers that are automatically updated can be virtual registers which have corresponding physical registers in each of the execution clusters. The values stored in these "automatic" registers are updated whenever any one of the clusters writes a new value to the registers. Examples of automatically updated registers could include stack pointers, or any other special purpose register generally used by the instructions. In the case where an instruction writes to an automatic register, a copy of the instruction is distributed to each cluster having a copy of the automatic register.

In order to properly recover correct data states after a branch mis-prediction, or an exception or interrupt condition, the D-cache 202 can be equipped with a store buffer 206. Normally, data are maintained in the store buffer 206 until all instructions having lower serial numbers have been committed. That is, the data are not written to the D-cache until it is certain that any instruction needing to operate on the data has successfully completed.

For, example, for a "store" instruction that determines the destination address in one cluster, and receives the source data from another cluster, cloned copies of the store instruction are sent to both clusters by the instruction distribution unit 204. The cluster determining the destination address stores the destination address in the store buffer 206 at a location of the D-cache 202 corresponding, for example, to the serial number of the store instruction.

Concurrently, the data to be stored are sent to the D-cache 202 by the cluster generating the result data. The data are also placed in the store buffer 206, with corresponding address and data placed at the same location of the store buffer, based on their common instruction serial number. Therefore, each location of the store buffer 206 can only have address and data from one instruction, since each location of the buffer must have an unique instruction serial number.

While data are "uncommitted," load requests for the uncommitted data stored must be read from the store buffer 206. Thus, there can be multiple locations of the store buffer 206 corresponding to a destination address. While by-passing the D-cache 202, a load instruction must take the data from the location having the highest serial number, e.g., the data generated by the most recently executed instruction with the same destination address, but not data stored at a location having the serial number of a store instruction which has a higher serial number than the load instruction.

Because load and store instructions can operate on data having different data widths, e.g., 1,2, 4, or 8 bytes, one load instruction e.g., a load of 8 bytes, may have to read data from several locations of the store buffer 206, e.g., some of the data may come from locations where uncommitted data are written, and some of the data may come from the D-cache 202 itself.

A load instruction having register operands in more than one cluster has copies of the instruction distributed to all of the clusters in which the load instruction has operands. Data to be fetched from the D-cache 202, may be preempted by data maintained in the store buffer 206, if necessary. The data are then sent to the cluster containing the destination operand of the load instruction.

When a load instruction is issued to the cluster which will perform the source address calculation, a signal is sent to the cluster containing the destination operand. This signal tells the copy of the load instruction in the "destination" cluster to issue. Because the issue of the load instruction in the destination cluster is delayed by a cycle with respect to the issue of the load instruction in the source cluster, any data loaded from the D-cache 202 can temporarily be stored in a load staging buffer. Data in the load staging buffer may be by-passed for use in other computations in the cluster.

In systems with a large number of clusters, there may be times when data required by several load instructions need to be forwarded to a single destination cluster. In this case, the data may need to be retained in the load staging buffer for more than one cycle until a write port of the register file becomes available. Similarly, due to other constraints, a load instruction in the destination cluster may not be able to issue immediately, which also increases the number of cycles that the load data need to be retained in the load staging buffer before the data are written to the register file of the destination cluster.

While specific implementations of the invention have been described, those familiar with the art will appreciate that the invention may be practiced in other ways while still remaining within the scope and spirit of the appended claims.

What is claimed is:

1. A superscalar processor comprising:

an instruction cache for storing instructions, some of the instructions including at least one operand, each operand having a virtual register address;

a plurality of execution clusters for executing instructions, each execution cluster comprising a plurality of execution units, each including at least one arithmetic unit and one or more memory access units, and each execution cluster further including a plurality of registers having disjoint physical register addresses, each register corresponding to a unique one of the virtual register addresses;

an instruction partitioning and distribution unit for fetching instructions from the instruction cache, partitioning instructions into a plurality of sets of instructions and distributing each instruction that includes at least one operand to the one of the plurality of execution clusters having the register corresponding to the virtual register address of the operand, addresses of data stored in the plurality of registers accessed by a plurality of instructions being disjoint among said plurality of execution clusters, instructions with virtual register addresses having operands assigned to corresponding physical register addresses at the time instructions are issued for execution, the instruction partitioning and distribution unit further comprising:

a distribution buffer, the distribution buffer having a plurality of locations for storing instructions for distribution to the plurality of execution clusters; and means for assigning a unique serial number to each of the plurality of instructions stored in the distribution buffer, the serial numbers assigned in the order that the plurality of instructions are fetched from the instruction cache, and the serial numbers distributed to the execution clusters with the instructions;

a central controller, connected in a communicating relationship with the instruction partitioning distribution unit and the plurality of execution clusters for distributing instructions, dependent on a predicted behavior of execution flow based on previously executed instructions, for coordinating the functioning of the superscalar processor and for monitoring the serial number of each instruction in each of the execution clusters.

2. The processor of claim 1 wherein the distribution buffer further comprises a plurality of pickers of which each is associated with a different one of the execution clusters, each picker selecting instructions for its associated execution cluster.

3. The processor of claim 1 wherein each execution cluster further comprises a register renaming unit, each register having a plurality of physical register addresses and each register renaming unit for receiving instructions from the instruction distribution unit and renaming any virtual register addresses of the instructions to correspond to the physical register addresses of the execution cluster.

4. The processor of claim 3 wherein each execution cluster further comprises:

a dispatch buffer connected to the register renaming unit for storing instructions to be issued to the plurality of execution units of the execution cluster; and an instruction scheduling controller, connected to the dispatch buffer for dynamically scheduling each instruction for issue to a particular one of the plurality of execution units of the execution cluster.

5. The processor of claim 1, wherein each of the instructions having virtual register addresses for more than one execution cluster is cloned by the instruction distribution unit and distributed by the instruction distribution unit to each execution cluster having one or more registers corresponding to one or more of the virtual register addresses of these instructions.

6. The processor of claim 1, further comprising a plurality of transfer staging buffers for transferring operands between execution clusters when an instruction in one execution cluster requires an operand in a different one of the execution clusters.

7. A method for executing instructions in a superscalar processor, the method comprising the steps of:

storing instructions in an instruction cache;

providing a plurality of execution clusters, each execution cluster comprising a plurality of execution units, each executing unit including at least one arithmetic unit, one or more memory access units, and each execution cluster further including a plurality of registers having disjoint physical register addresses;

fetching instructions from the instruction cache, partitioning instructions into a plurality of sets of instructions, some of the instructions having at least one opcode and at least one operand, each of operand including a virtual register address which corresponds to a physical register address of one of the execution clusters, addresses of data in the plurality of registers accessed by instructions being disjoint among said plurality of execution clusters, instructions with virtual register addresses having operands assigned to corresponding physical register addresses at the time when instructions are issued for execution;

distributing each instruction having an operand to one of the plurality of execution clusters according to the virtual register address of the operand and dependent on a predicted behavior of execution flow based on previously executed instructions;

scheduling the instructions for issue to one of the execution units; and executing the instructions;

wherein the step of distributing the instructions to the plurality of execution clusters further comprises the steps of cloning instructions that have virtual register addresses corresponding to more than one execution cluster and distributing the cloned instructions to each execution cluster having a physical register address corresponding to one of the virtual register addresses of the instruction.

8. The method of claim 7 wherein the step of scheduling the instructions further comprises the step of scheduling each instruction for issue to one of the execution units based upon the opcode of the instruction.

9. The method of claim 7, further comprising the step of transferring an operand between execution clusters when an instruction in a first execution cluster has a source operand in a second execution cluster.

* * * * *